United States Patent [19]

Rutledge

[11] 4,362,482

[45] Dec. 7, 1982

[54] APPARATUS FOR EXTRUDING THERMOPLASTIC COMPOSITIONS

[75] Inventor: Raleigh N. Rutledge, Big Spring, Tex.

[73] Assignee: Cosden Technology, Inc., Big Spring, Tex.

[21] Appl. No.: 298,361

[22] Filed: Sep. 1, 1981

Related U.S. Application Data

[63] Continuation of Ser. No. 110,529, Jan. 9, 1980, abandoned.

[51] Int. Cl.³ .......................... B29D 7/02; B29F 3/08
[52] U.S. Cl. .................................. 425/4 C; 137/340; 165/141; 165/155; 425/378 R; 425/817 C
[58] Field of Search .............. 425/376R, 377, 378 R, 425/379, 380, 4 C, 817 C, 465, 461; 165/141, 155; 137/340, 334

[56] References Cited

U.S. PATENT DOCUMENTS

| | | | |
|---|---|---|---|
| 3,117,620 | 1/1964 | Fuller | 165/40 |
| 3,151,192 | 9/1964 | Jacobs et al. | 264/53 |
| 3,213,929 | 10/1965 | Marshall et al. | 165/40 |
| 3,275,731 | 9/1966 | Kosinsky | 264/176 |
| 3,310,617 | 3/1967 | Dyzert et al. | 264/53 |
| 3,385,917 | 5/1968 | Brewkink et al. | 264/51 |
| 3,393,427 | 7/1968 | Larsen | 425/379 |
| 3,444,283 | 5/1969 | Carlson | 264/53 |
| 3,588,955 | 6/1971 | Azuma | 425/379 |
| 3,658,973 | 4/1972 | Aykanian | 264/53 |
| 3,751,377 | 8/1973 | Buckner | 260/2.5 E |
| 3,764,642 | 10/1973 | Boutillier | 425/4 C |
| 3,827,841 | 8/1974 | Kawai et al. | 425/4 C |
| 3,830,901 | 8/1974 | Winstead | 264/51 |

FOREIGN PATENT DOCUMENTS

2003080 3/1979 United Kingdom .

Primary Examiner—Willard E. Hoag

[57] ABSTRACT

Disclosed is an apparatus for extruding thermoplastic compositions, comprising an extruder; a cooling device positioned downstream of the extruder for cooling the heat plastified thermoplastic resinous composition exiting from the extruder to a uniform temperature desired for extrusion through an extrusion die, the cooling device including at least one enclosed flow path for conveying the resinous composition from the inlet of the cooling device to the outlet of the cooling device, structure for circulating a cooling medium about the entire circumference of each of the resin flow paths and a device for maintaining a hydraulic balance between the inlet and the outlet of the cooling means across the entire cross-section of each of the resin flow paths; and an extrusion die positioned downstream of the cooling device.

14 Claims, 14 Drawing Figures

APPARATUS FOR EXTRUDING THERMOPLASTIC COMPOSITIONS

This application is a continuation of application Ser. No. 110,529, filed Jan. 9, 1980, and now abandoned.

BACKGROUND OF THE INVENTION

The present invention relates to an apparatus for use in the extrusion of thermoplastic compositions and more especially to an apparatus for use in the extrusion of foamed thermoplastic compositions. The apparatus disclosed herein is useful for extruding compositions comprising a major portion of at least one thermoplastic resin which is either amorphous or crystalline in nature.

In the conventional process employed in the plasticts industry for extruding thermoplastic compositions, beads or pellets of at least one thermoplastic resin and various other additives are introduced into the feed zone of a screw-type extruder. In the extruder, the thermoplastic resin and additives are heated and mixed to form a substantially homogenous, continuous, flowable composition which is then forced by the screw through an extrusion die to produce a product of the desired shape and dimensions.

As the thermoplastic composition passes through the extruder, its temperature increases significantly due to the combined shear and compressive forces applied to the material by the rotating extruder screw. For a given extruder, the magnitude of the temperature increase varies according to the rotation rate of the extruder screw and the shear properties of the particular thermoplastic composition being run. While some heating is desirable and necessary for achieving satisfactory extrusion, excess heat must be removed from the material downstream of the extruder in order to retain the shape and integrity of the extruded product. Typically, this is done by passing the extrudate over chill rolls or through cooling vats downstream of the extrusion die.

Because the temperature of the extrudate exiting the extrusion die is proportional to the rotation rate of the extruder screw when operating under standard conditions (i.e., an increase in throughput requires a higher temperature), conventional extrusion lines have been limited as regards their throughput rates by the capacity of the cooling equipment downstream of the extrusion die. Even where the downstream cooling capacity is adequate, the extrudate can undergo thermal shock if its temperature is reduced too rapidly over a wide temperature differential, thereby adversely affecting its mechanical properties.

Particular problems are encountered in the extrusion of foamed thermoplastic compositions. Extruders for foamed thermoplastic compositions are typically run at high pressures to keep the blowing agent condensed until the composition emerges from the extrusion die. If the temperature of the foamed product as it emerges from the extrusion die is significantly greater than that required to achieve satisfactory extrusion, the blowing agent will overexpand once the pressure is relieved, resulting in cell rupture and the loss of dimensional stability and compositional integrity. If the temperature is too low, expansion will be incomplete and poor density properties will result. For some polymers, such as polyethylene, the correct temperature window is only about ±2° F.

Furthermore, the problem is not only one of achieving a specific absolute temperature, but uniformity of temperature. If temperature gradients exist within the polymer mass, uneven blowing takes place, again causing ruptured cells and poor density values. At high throughputs, the existance of temterature gradients is more likely to occur.

Therefore, in connection with the extrusion of foam products, it is extremely difficult to obtain an increase in throughput for an extrusion line while at the same time not causing a deterioration in the physical properties of the resulting product, such as the size, uniformity and integrity of the cells and the density value of the foamed polymer. In addition, these problems are exacerbated when, as often desired, various additives are incorporated into the foamed product, such as, for example, a fire-retardant.

Several measures have been taken in the past to solve these problems. For example, it is common to employ two separate extruder screws connected in series. See, e.g., U.S. Pat. No. 3,860,220. In this configuration the screw of the second extruder merely acts as an auger to convey the thermoplastic composition through the extruder, which is jacketed and cooled with a circulating cooling medium. However, the use of a second extruder in this capacity has proven to be a very expensive, both from an equipment and an energy standpoint, and an inefficient method for cooling a foamed material. Temperature gradients are actually produced in such a second screw, because heat is generated at the screw, while cooling is applied from the outside. Furthermore, because of the high pressures employed in foam extrusion, problems are often encountered with the rear seals of the second extruder screw. Failure of the rear seals can result in damage to the gear box from the escaping polymer as well as undesirable leakage of the blowing agent.

Another solution is to decrease the rotational speed of the extruder screw; however, this measure is obviously antithetical to an increase in extrusion line throughput.

Other measures have included the inclusion of cooling devices in the downstream portion of the extruder (see, e.g., U.S. Pat. Nos. 3,658,917, 3,151,192, 3,444,283 and 3,658,973 and British Pat. No. 2,003,080) or in conjunction with the extrusion die itself (See, e.g., U.S. Pat. Nos. 3,393,427 and 4,088,434 and U.S.S.R. Pat. No. 592,610). These die units are very expensive to begin with and even more expensive to modify in this manner. Furthermore, they are not effective heat exchange elements, and therefore do not permit significant increases in throughput.

It is also possible to increase the amount of cooling capacity downstream of the extrusion die. See, e.g., U.S. Pat. No. 3,764,642. However, this gives rise to the problem of thermal shock, mentioned above, and moreover, the most essential cooling often is required upstream of the die orifice in order that the resin can be extruded within a certain required temperature range. This is essential in the case of foam extrusion.

Other attempts have been made to interpose some sort of a cooling device between the extruder and the extrusion die. See, e.g., U.S. Pat. Nos. 3,310,617, 3,275,731, 3,751,377, 3,588,955, 3,827,841 and 3,830,901. These efforts have indeed increased the total heat exchange or cooling capacity of the extrusion line; however, they have not been successful in solving the problem of temperature uniformity, as evidenced, for example, by the need to include an additional mixing device downstream of the heat exchange or cooling device, e.g., in U.S. Pat. No. 3,588,955, FIG. 3. Furthermore, while some increase in throughput has been accomplished (See, e.g., U.S. Pat. No. 3,827,841) by these prior measures, it has not been possible to achieve such increases above a certain level, while at the same time producing a foamed product having the desired physical properties.

An extrusion apparatus for thermoplastic compositions is therefore needed which will simultaneously permit increased throughput through the extruder and not result in deterioration of the physical properties of the extruded product. An apparatus is particularly needed which will permit the extrusion of foamed thermoplastic compositions at increased production rates with excellent physical properties, preferably by means of an extruder employing a single screw.

SUMMARY OF THE INVENTION

It is therefore an object of the present invention to provide an improved apparatus for extruding thermoplastic resinous materials.

It is also an object of the invention to provide such an apparatus which enables significantly increased throughputs of resinous material through the extrusion line, preferably with the use of a single screw-type extruder.

A further object of the invention resides in providing such an apparatus which enables not only increased throughputs in material but also the production of extruded products having excellent physical properties.

It is a particular object of the invention to provide an improved apparatus for extruding foamed thermoplastic resinous materials, especially those which require precise temperature control and uniformity of temperature.

Another particular object of the invention is to provide such an apparatus which enables significantly increased throughputs of foamed thermoplastic material without deterioration of the physical properties of the foamed product, such as cell size, cell uniformity, density, tear resistance and the like.

It is still another object of the invention to provide an apparatus for extruding foamed thermoplastic material containing significant quantities of additives, such as flame-retardant additives.

In accomplishing the foregoing objects, there has been provided in accordance with the present invention an apparatus for extruding thermoplastic resinous compositions, comprising an extruder for heat plastifying the thermoplastic resinous composition and forwarding same in an extrusion direction; means, positioned downstream of the extruder and communicating with the outlet port of the extruder, for cooling the heat plastified thermoplastic resinous composition exiting from the extruder to a uniform temperature desired for extrustion through an extrusion die, this cooling means including at least one enclosed flow path for conveying the heat plastified thermoplastic resinous composition from the inlet of the cooling means to the outlet of the cooling means, means for circulating a cooling medium about the entire circumference of each of the resin flow paths and means for maintaining a hydraulic balance between the inlet and the outlet of the cooling means across the entire cross-section of each of the resin flow paths; and an extrusion die, including a die orifice and being positioned downstream of the cooling means and communicating with the outlet of the cooling means for receiving cooled, heat plastified thermoplastic resinous composition therefrom for extrusion through the die orifice. Preferably, the extruder comprises only a single extruder screw and means for introducing a blowing agent into the heat plastified thermoplastic resinous composition contained in the extruder in order to produce a foamed product.

In one embodiment of the invention, the cooling means comprises a substantially cylindrical vessel having three generally concentrically arranged axial passageways, wherein the enclosed flow path comprises the middle passageway and wherein the cooling medium circulating means comprises the inner and outer passageways. In this embodiment, the hydraulic balance maintaining means comprises a plurality of first apertures evenly spaced about the circumference of the inlet end of the middle passageway and a plurality of second apertures evenly spaced about the circumference of the outlet end of the middle passageway, with the second apertures being sized in relationship to said first apertures so as to maintain the hydraulic balance.

In another embodiment of the invention, the cooling means comprises a shell member adapted to circulate a cooling medium therein and a plurality of tubes positioned in the shell member to define a plurality of the enclosed flow paths for conveying the heat plastified thermoplastic resinous composition. In this embodiment, the hydraulic balance maintaining means comprises an orifice of reduced size positioned in the upstream end of each of the tubes. The orifices each have a size defined by the relationship $$\frac{\text{Tube length}}{\text{Tube diameter}} : \frac{\text{Orifice length}}{\text{Orifice diameter}} = \text{at least about } 25:1,$$

preferably about 40:1 to 100:1 and most preferably at least about 50:1.

Further objects, features and advantages of the present invention will become readily apparent from the detailed description of preferred embodiments which follows, when considered together with the attached figures of drawing.

BRIEF DESCRIPTION OF THE DRAWINGS

The invention will be explained in further detail with reference to the accompanying drawings wherein.

DETAILED DESCRIPTION OF PREFERRED EMBODIMENTS

Figure 1:
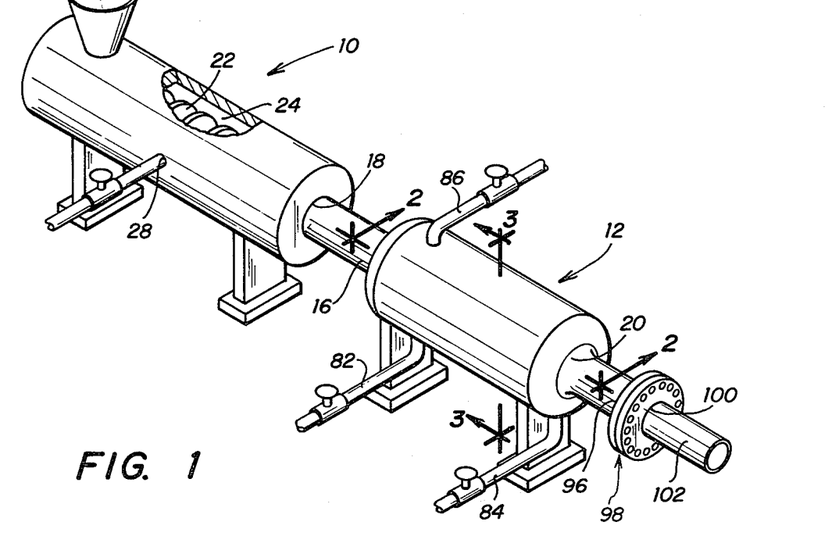
FIG. 1 is a simplified perspective view of an apparatus disclosed herein for extruding foamed thermoplastic compositions.

Referring to FIG. 1, one embodiment of the invention is a combination comprising extruder 10, cooling means 12 and extrusion die 98 as its three principal elements. The three principal elements are positioned and installed so that inlet port 16 of cooling means 12 communicates with outlet port 18 of extruder 10, and extrusion die 98 communicates with outlet port 20 of cooling means 12. In this figure, a tubular extruded product 102 is shown exiting from die orifice 100. Extruder 10 has been partially cut away to reveal barrel 24 having a single extruder screw 22 positioned therein in such a manner that the screw 22 is rotatable about its longitudinal axis. Thermoplastic material is introduced into extruder 10 through feed port 26. When producing foamed thermoplastic compositions, a blowing agent is introduced through blowing agent inlet port 28 into barrel 24 around extruder screw 22. Extruder 10 is a conventional motor-driven, single stage, screw-type extruder which is commercially available and well known to those of ordinary skill in the art.

Figure 2:
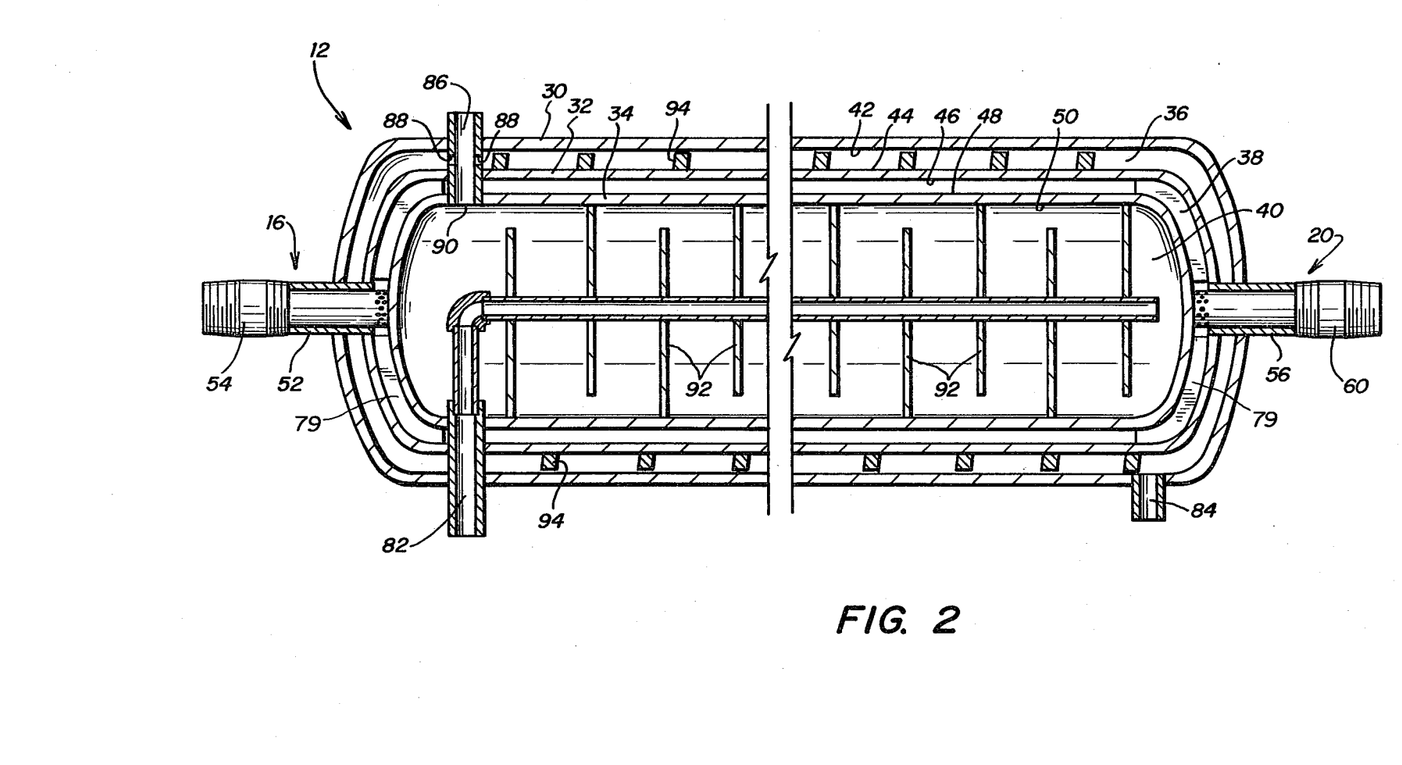
FIG. 2 is an enlarged longitudinal sectional elevation view of one cooling means of the invention, viewed along line 2—2 of FIG. 1.
Figures 3, 4:
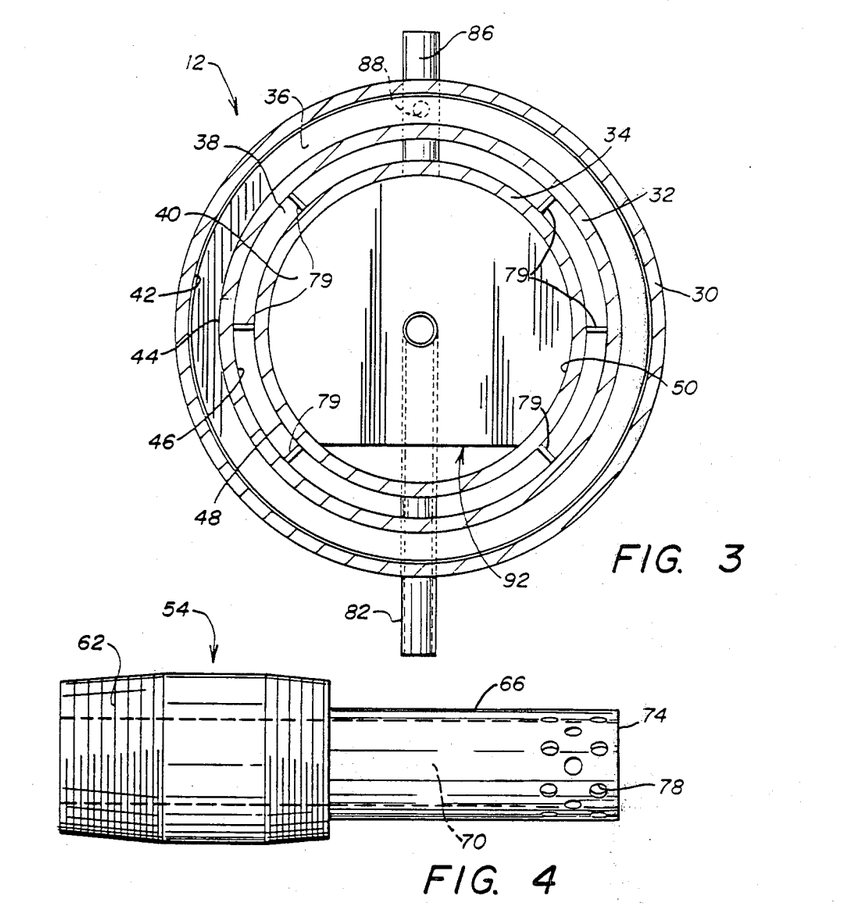
FIG. 3 is an enlarged transverse sectional elevation view of the cooling means shown in FIG. 2, viewed along line 3—3 of FIG. 1.
FIG. 4 is an enlarged elevation view of a preferred inlet nozzle means for the cooling means shown in FIGS. 1-3.

FIG. 2 is an enlarged longitudinal sectional elevation view of one embodiment of cooling means 12 according to the invention, taken along line 2—2 of FIG. 1. This cooling means 12 preferably comprises a three-chambered, substantially cylindrical vessel adapted to transfer heat from a thermoplastic composition which is received through cooling means inlet port 16 of cooling means 12 from outlet port 18 of extruder 10 shown in FIG. 1. More particularly, cooling means 12 preferably comprises three concentrically and coaxially positioned vessels identified in FIG. 2 as outer vessel 30, middle vessel 32 and inner vessel 34. The three vessels are substantially cylindrical in shape, having annular cross sections as shown in FIG. 3, which is a transverse sectional elevation view taken along line 3—3 of FIG. 1. The lengths and diameters of the vessels are preferably designed so that inner wall 42 of outer vessel 30 and outer wall 44 of midle vessel 32 are equidistant at all points. Although none are shown in FIG. 2, it will be apparent to those of ordinary skill that positioning pins can be employed where needed to aid in maintaining the alignment of the vessels. The exact spacing in any particular design will depend on the design flow rate and the properties of the fluids involved. The interior space thus defined is identified as outer chamber 36 in FIGS. 2 and 3. Similarly, inner wall 46 of middle vessel 32 and outer wall 48 of inner vessel 34 are preferably equidistant at all points, thereby defining middle chamber 38 for the flow of a heat plastified thermoplastic resinous material. Finally, inner chamber 40 is defined by inner wall 50 of inner vessel 34.

Cooling means 12 is adapted to receive a thermoplastic composition from extruder 10 by attaching cooling means inlet port 16 to the proximal end of middle vessel 32 in such manner that the interior of cooling means inlet port 16 communicates with middle chamber 38. Preferably, as shown in FIG. 2, exterior wall 52 of cooling means inlet port 16 is threaded to receive inlet nozzle 54. Likewise, exterior wall 56 of cooling means outlet port 20 is preferably threaded to receive outlet nozzle 60.

Figure 5:
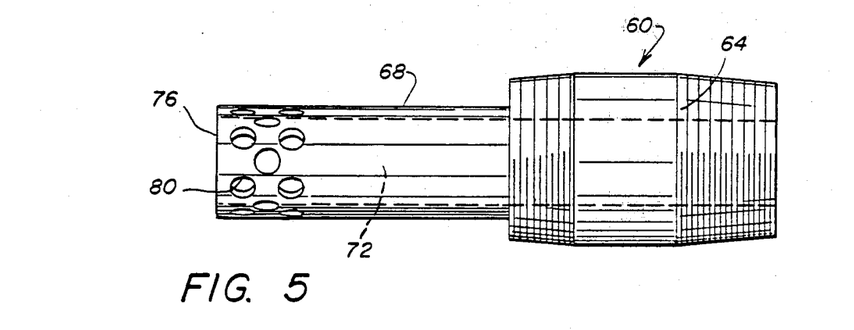
FIG. 5 is an enlarged elevation view of a preferred outlet nozzle means for the cooling means shown in FIGS. 1-3.

Inlet nozzle 54 and outlet nozzle 60 are further described with reference to enlarged elevation views depicted in FIGS. 4 and 5, respectively. Inlet nozzle 54 and outlet nozzle 60 each comprise threaded engagement members 62, 64 and elongated sleeve members 66, 68, respectively. Elongated sleeve members 66, 68 further comprise longitudinal bores 70, 72 having a diameter which is adequate to accommodate the flow of thermoplastic composition desired to pass therethrough. The length of sleeve members 66, 68 is preferably such that, when engagement member 62 of inlet nozzle 54 or engagement member 64 of outlet nozzle 60 is threaded onto cooling means inlet port 16 or cooling means outlet port 20, respectively, sleeve end faces 74, 76 will contact the end wall of inner vessel 34, as shown in FIG. 2. To permit the thermoplastic composition to flow from inlet nozzle 54 into middle chamber 38 and from middle chamber 38 into outlet nozzle 60, each nozzle further comprises a plurality of small orifices 78, 80 bored in a radial direction through that portion of sleeve members 66, 68 which is positioned inside middle chamber 38 when engagement members 62, 64 of inlet nozzle 54 or outlet nozzle 60 are threadably engaged with their respective ports and the sleeve end faces 74, 76 abut the end wall of inner vessel 34.

In accordance with the present invention, it has been discovered that the throughput of an extrusion line such as the one illustrated in FIG. 1 can surprisingly be increased by a considerable factor in comparison to similar prior art extrusion lines if measures are taken to maintain a hydraulic balance of the thermoplastic resin as it flows through cooling means 12. This is achieved in the embodiment shown in FIGS. 2–5 by the proper placement and sizing of orifices 78, 80 in the inlet and outlet nozzles 54, 60.

Orifices 78, 80 are distributed uniformly around the circumference of sleeve members 66, 68 in order to assure that the thermoplastic resin is metered uniformly into middle chamber 38 about its entire entrance circumference, and that it can uniformly converge again into outlet nozzle 60. This function of providing uniform distribution and collection flow can be augmented by providing a plurality of baffle or vane members 79 which are distributed about the circumference of the generally circular outer surface 48 of the ends of inner vessel 34 and emanate generally radially from the immediate vicinity of inlet and outlet nozzles 54, 60. These baffle or vane members 79 can be positioned between each set of circumferentially adjacent orifices 78, 80 or between groups of circumferentially adjacent orifices 78, 80. Baffle or vane members 79 preferably extend across the entire gap width of middle chamber 38, and they preferably extend a substantial portion of the radial distance defined by the end faces of inner vessel 34, e.g., at least half this distance and advantageously the entire distance, or even along a portion of the axially-running outer surface 48 of inner vessel 34.

The combined area of orifices 80 in outlet nozzle 60 is somewhat larger than that of orifices 78 of inlet nozzle 54. This slight increase in area of orifices 80 in outlet nozzle 60 is sufficient to create a uniform backpressure and hence a hydraulic balance in middle chamber 38, thereby promoting uniform mass flow of the thermoplastic composition, and thereby avoiding channeling of the thermoplastic composition through middle chamber 38 which otherwise takes place. It is not possible to give a precise quantitative relationship between the sizes of the orifices 80 and the orifices 78, since the relationship varies depending upon, e.g., the particular thermoplastic resin which is being run and the respective resin inlet and outlet temperatures. Generally, the orifices 80 in the outlet nozzle 60 should be about 5 to 15% larger in total area than the orifices 78 in the inlet nozzle 54. It is preferred to have the same number of inlet orifices 78 as outlet orifices 80, with the latter being of larger diameter. Outlet orifices must be sized so that they will not permit channel flow within the cooling means due to localized overheating of the resin. Once this localized overheating occurs and regions of channel flow begin, the effectiveness of the cooling means is drastically reduced. Orifices 78, 80 in inlet nozzle 54 and outlet nozzle 60 further aid in blending the thermoplastic composition passing therethrough.

As shown in FIGS. 1-3, cooling means 12 further comprises means for receiving and circulating a cooling medium on both sides of middle chamber 38 through which the thermoplastic composition flows. More particularly, first cooling medium inlet pipe 82 is connected to inner vessel 34 in such a manner that it communicates with inner chamber 40 of cooling means 12. Similarly, second cooling medium inlet pipe 84 shown in FIGS. 1 and 2 is connected to outer vessel 30 so that it communicates with outer chamber 36. Cooling medium inlet pipes 82, 84 are preferably connected to vessels 30, 34, respectively, in such a manner that the cooling medium flowing into cooling means 12 initially contacts outer wall 44 of middle vessel 32 and inner wall 50 of inner vessel 34 near the downstream end of middle chamber 38. When constructed in this manner, the flow of cooling medium through outer chamber 36 and inner chamber 40 is substantially countercurrent to the flow of thermoplastic composition through middle chamber 38, thereby promoting more efficient heat transfer. Cooling means 12 further comprises cooling medium outlet pipe 86 which communicates by means of cooling medium outlets 88, 90 with outer chamber 36 and inner chamber 40, respectively.

A satisfactory cooling medium for use with cooling means 12 is an oil having a flash point higher than the temperature of the thermoplastic composition entering through inlet nozzle 54. Other suitable heat exchange fluids, such as hydraulic fluids and the like, can also be used. After exiting cooling means 12, the cooling medium can itself be cooled such as, for example, with water and then recirculated to first and second cooling medium inlet pipes 22, 24.

To promote heat transfer between the thermoplastic composition and the circulating cooling medium, it is desirable to control the flow of circulating cooling medium through outer chamber 36 and inner chamber 40 in such a manner that it maintains significant surface contact with outer wall 44 of middle vessel 32 and inner wall 50 of inner vessel 34. Although various means for accomplishing this result will be apparent to those of ordinary skill upon reading this disclosure, satisfactory results have been achieved by means of the flow control devices depicted in FIGS. 2 and 3. More particularly, vertical baffles 92 have been positioned inside inner chamber 40 and affixed to inner wall 50 of inner vessel 34. Similarly, metal band 94 has been spirally wrapped around outer wall 44 of middle vessel 32 and welded thereto to direct the flow of cooling medium entering outer chamber 36 through cooling medium inlet pipe 82 toward cooling medium outlet ports 88, 90 in cooling medium outlet pipe 86.

Referring again to FIG. 1, cooling means outlet port 20 is connected to and communicates with extrusion die inlet port 96. Upon exiting cooling means 12, the cooled thermoplastic composition is directed through extrusion die inlet port 96 into and through the annular die orifice 100 in extrusion die 98. In the case of extruding resin compositions containing a blowing agent, the extruded profile undergoes rapid expansion upon exiting the die orifice 100. Expansion of extrudate 102 occurs since the external pressure is reduced to atmospheric level upon exiting extrusion die 98, permitting the blowing agent to expand around each nucleator particle, thereby forming the individual cells. While extrudate 102 is shown in FIG. 1 as a foamed thermoplastic tube, it will be readily understood that the shape and dimensions of extrudate 102 can be varied to any desired configuration by the substitution of a different extrusion die.

Although the foregoing detailed description has been directed to an embodiment of the apparatus of the invention useful for the production of foamed thermoplastic articles, it will be apparent to those of ordinary skill in the art upon reading the specification that the disclosed apparatus is also useful for the production of thermoplastic compositions containing no blowing agent. Thus, for example, by closing blowing agent inlet port 28 by means of a valve or the like and by substituting an extrusion die comprising a horizontal slit, it is possible to extrude a thermoplastic sheet material on the same apparatus. Similarly, if there is no intention to ever produce foamed thermoplastic compositions on a particular extrusion line, there is no requirement that a blowing agent inlet port be provided in the extruder. The advantages achieved by the present invention as regards increased throughput of thermoplastic resin are also attained in the case of a nonfoam extrusion process; however, the increases are often not as significant in view of the fact that nonfoam processes often have less stringent temperature requirements for the resin as it enters the extrusion die.

Satisfactory thermoplastic resins for use in the subject apparatus are selected from the group consisting of both crystalline and amorphous polymers. Preferred thermoplastic resins for use in the subject apparatus include, for example, polystyrene, polyvinyl chloride, acrylonitrile-butadiene-styrene, polyethylene, polypropylene, polyalkylene terephthalates, and the like. Those of ordinary skill will appreciate that various other copolymers and terpolymers of the above-mentioned crystalline and amorphous polymers can also be employed in the subject apparatus. In addition to the thermoplastic resin, the composition provided to the feed port of the extruder can also comprise other optional ingredients, including, without limitation, lubricants, nucleators, rubbery materials, ionomer resins, coloring agents, ultraviolet light stabilizers, fire-retartands and the like. Where the apparatus is employed for the production of foamed thermoplastic compositions, satisfactory blowing agents include, for example, methyl chloride, carbon dioxide, ammonia, air, n-pentane, isopentane, fluorocarbons, and mixtures thereof.

Figure 6:
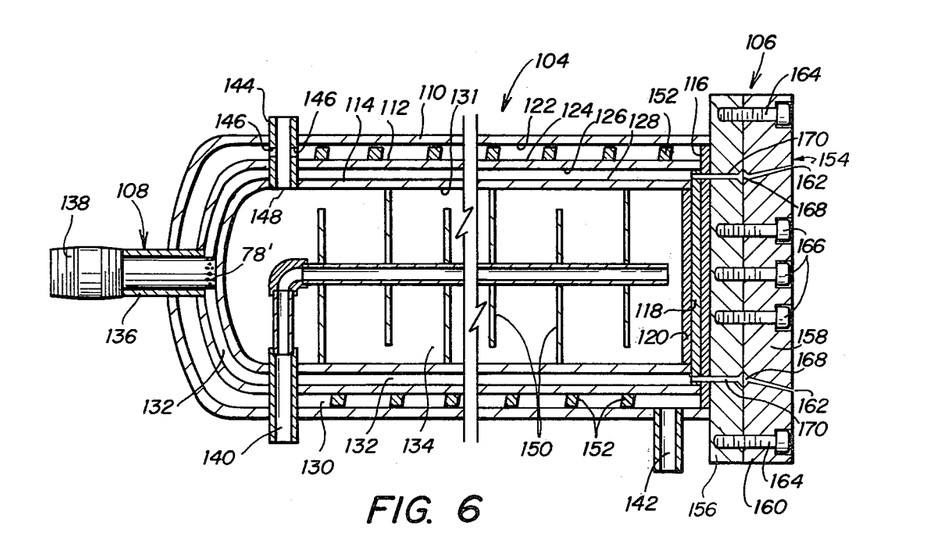
FIG. 6 is an enlarged longitudinal sectional elevation view of an alternate embodiment of the cooling means, comprising an extrusion die communicating with and integrally attached to the distal end thereof.

According to another preferred embodiment of the invention, an apparatus comprising a novel cooling means having an extrusion die integrally connected to and communicating with the downstream thereof is also provided. A longitudinal sectional elevation view of this embodiment is shown in FIG. 6. Referring to FIG. 6, the subject apparatus comprises cooling means assembly 104 and extrusion die assembly 106.

Cooling means assembly 104 preferably comprises a three-chambered, substantially cylindrical vessel adapted to transfer heat from a thermoplastic composition received through inlet port 108 from the outlet port of an extruder, such as that shown in FIG. 1. More particularly, cooling means assembly 104 preferably comprises three concentrically and coaxially positioned vessels identified in FIG. 6 as outer vessel 110, middle vessel 112 and inner vessel 114. The three vessels are substantially cylindrical in shape, having annular cross sections, and can be conveniently fabricated from commercially available, nominal diameter pipe. The upstream ends of outer vessel 110, middle vessel 112 and inner vessel 114 are enclosed by conventional weld caps; the downstream ends of those vessels are enclosed by flat, circular plates 116, 118, 120 which are welded to the respective vessels as shown in FIG. 6. The length and diameters of the vessels are preferably designed in such manner that inner wall 122 of outer vessel 110 and outer wall 124 of middle vessel 122 are equidistant at all points. The exact spacing in any particular design will depend on the design flow rate and the properties of the fluids involved. The interior space thus defined is identified as outer chamber 130. Similarly, inner wall 126 of middle vessel 112 and outer wall 128 of inner vessel 114 are preferably equidistant at all points, thereby defining middle chamber 132 for the flow of a thermoplastic resin. Finally, inner chamber 134 is defined by inner wall 131 of inner vessel 114.

Cooling means assembly 104 is adapted to receive a thermoplastic composition by attaching inlet port 108 to the upstream end of middle vessel 112 as shown in FIG. 6 in such manner that the interior or inlet port 108 communicates with middle chamber 132. Preferably, exterior wall 136 of inlet port 108 is threaded to receive inlet nozzle 138. Inlet nozzle 138 is the same as inlet nozzle 54 shown in FIG. 4, and the description of that figure may be referred to for the details of inlet nozzle 138.

Cooling means assembly 104 is adapted to receive and circulate a cooling medium on both sides of middle chamber 132 through which the thermoplastic composition flows. A satisfactory cooling medium for use with cooling means assembly 104 is oil having a flash point higher than the temperature of the thermoplastic composition entering through inlet nozzle 108. First cooling medium inlet pipe 140 is connected to inner vessel 114 in such manner that it communicates with inner chamber 134 of cooling means assembly 104. Similarly, second cooling medium inlet pipe 142 is connected to outer vessel 110 in such manner that it communicates with outer chamber 130. Cooling medium inlet pipes 140, 142 are preferably connected to vessels 114, 110, respectively, in such manner that the cooling medium flowing into cooling means assembly 104 initially contacts outer wall 124 of middle vessel 112 and inner wall 131 of inner vessel 114 near the downstream end of middle chamber 132. When constructed in this manner, the flow of cooling medium through outer chamber 130 and inner chamber 134 is substantially countercurrent to the flow of thermoplastic composition through middle chamber 132, thereby promoting more efficient heat transfer. Cooling means assembly 104 further comprises cooling medium outlet pipe 144 which communicates by means of cooling medium outlet ports 146, 148 with outer chamber 130 and inner chamber 134, respectively.

To promote heat transfer between the thermoplastic composition and the circulating cooling medium, it is desirable to control the flow of circulating cooling medium through outer chamber 130 and inner chamber 134 in such a manner that it maintains significant surface contact with outer wall 124 of middle vessel 112 and inner wall 131 of inner vessel 114. Although various means for accomplishing this result will be apparent to those of ordinary skill in the art, satisfactory results have been achieved by means of the flow control devices depicted in FIG. 6. More particularly, vertical baffles 150 are positioned inside inner chamber 134 and affixed to inner wall 131 of inner vessel 114. Similarly, metal band 152 is spirally wrapped around outer wall 124 of middle vessel 112 and affixed thereto to direct the flow of cooling medium entering outer chamber 130 through cooling medium inlet pipe 142 toward cooling medium outlet ports 146 in cooling medium outlet pipe 144.

As shown in FIG. 6, extrusion die assembly 106 preferably comprises extrusion die 154 and flange plate 156. Flange plate 156 is welded to end plate 116 and outer vessel 110 of cooling means assembly 104. Extrusion die 154 is a conventional ring die comprising inner die member 158 and outer die member 160, which together define annular orifice 162. Inner die member 158 and outer die member 160 are mounted on flange plate 156 by means of threaded engagement bolts 164, 166, respectively. Annulus 162 communicates with annular reservoir 168, which in turn communicates with middle chamber 132 of cooling means assembly 104 through a plurality of outlet orifices 170 bored through flange plate 156 and end plates 116, 118 at evenly spaced intervals around the annulus defined by the transverse cross section of middle chamber 132.

In this enbodiment, the hydraulic balance across cooling means 104 is maintained in a manner similar to that described above in connection with cooling means 12. A plurality of orifices 78' are provided in inlet nozzle 138, just as in inlet nozzle 54 illustrated in FIG. 4. At the outlet end of cooling means 104, the plurality of outlet orifices 170 are provided in end walls 116 and 118, in order to provide communication between middle chamber 132 and annular extrusion orifice 162 of extrusion die 154. The outlet orifices 170 have a similar function as the outlet orifices 80 in the embodiment of FIGS. 2-4, i.e., they provide a sufficient backpressure uniformly about the circumference of inner chamber 132 to produce a hydraulic balance of the heat plastified polymer flowing through the cooling means 104. Orifices 170 are accordingly somewhat larger than the inlet orifices 78' in order to provide the requisite backpressure. This avoids channeling and maintains a substantially uniform mass flow around the circumference of middle chamber 132. Preferably, the combined cross-sectional area of outlet orifices 170 is from about 5 to 15% larger than the combined cross-sectional area of the orifices 78' in inlet nozzle 138.

According to another embodiment of the invention, the apparatus described with reference to FIG. 6 is employed in combination with any conventional extruder to provide a novel apparatus for extruding thermoplastic compositions at significantly increased throughput rates not previously attainable.

Figure 7:
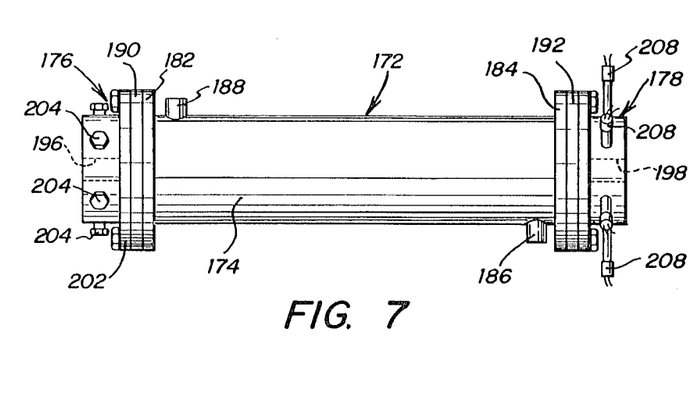
FIG. 7 is a longitudinal elevation view of another embodiment of the cooling means according to the invention.

Another embodiment of the subject invention is described with reference to FIGS. 7-14. FIG. 7 depicts a longitudinal elevation view of cooling means 172, which is adapted to circulate a cooling medium around a plurality of tubes 194 positioned inside shell 174 thereof. In addition to shell 174, cooling means 172 comprises inlet valve assembly 176, outlet thermocouple assembly 178, and tube sheet portion 180 which is normally positioned inside shell 174, but for illustrative purposes is shown in FIG. 8 isolated from the shell 174.

Shell 174 is preferably a substantially cylindrical vessel adapted for use in cooling means 172 of the invention by the addition of inlet shell flange 182, outlet shell flange 184, cooling medium inlet port 186, and cooling medium outlet port 188. Tube sheet portion 180 is adapted to be positioned inside shell 174 and bolted thereto by means of inlet tube sheet flange 190 and outlet tube sheet flange 192, or any other functionally equivalent means known to those of ordinary skill in the art. Tube sheet portion 180 comprises a plurality of tubes 194 adapted to transport a thermoplastic polymer composition from polymer inlet port 196 to polymer outlet port 198 through and generally countercurrent to the direction of the cooling medium passing through shell 174. The flow of cooling medium through shell 174 can be further controlled by the addition of baffles 200 or the like to tube sheet portion 180, as shown in FIG. 8. According to one preferred embodiment depicted in FIGS. 7-13, tube sheet portion 180 comprises six metal tubes which are evenly and circumferentially spaced about the longitudinal axis of cooling means 172.

Figure 8:
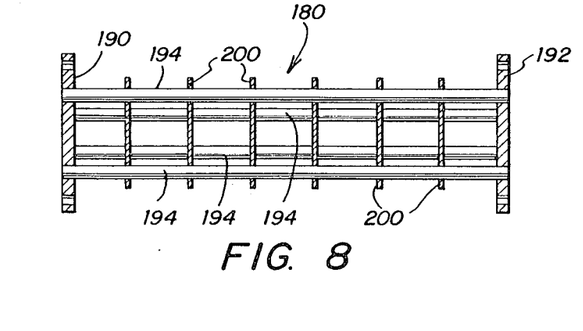
FIG. 8 is a longitudinal sectional elevation view of the tube sheet portion of the cooling means shown in FIG. 7.

As in the embodiments illustrated in FIGS. 1-6, it has been found that the throughput of a cooling device of the tube-in-shell type illustrated in FIGS. 7 and 8 can also be significantly increased by maintaining a hydraulic balance across the entire cross-section of the cooling device which is devoted to the transport of the thermoplastic polymer material. As a result, a significant increase in throughput is also possible for any extrusion line in which the cooling device is employed.

A hydraulic balance is maintained across the cooling device by carefully controlling the pressure drop through the individual tubes 194. This is preferably accomplished by creating an orifice in the upstream end of each tube 194. These orifices can be either of fixed size or of variable size, as will be discussed in more detail hereinbelow. It has been found that the following relationship must be satisfied in order to enable a hydraulic balance to be maintained for heat plastified polymeric materials:

$$\frac{\text{Tube length}}{\text{Tube diameter}} : \frac{\text{Orifice length}}{\text{Orifice diameter}} = \text{at least about 25:1}$$

This ratio is preferably within the range of about 40:1 to about 100:1, and most preferably is between about 50:1 and about 100:1. This means that the pressure drop through the orifice is at least about 25 times greater than the pressure drop through each individual tube, and most preferably about 50 times greater.

In carrying out this embodiment of the invention, it is preferred to use tubes having an internal diameter of between about ½ inch and about 2 inches. If the tube diameter becomes considerably smaller than ½ inch, the orifice must be made extremely small in order to satisfy the foregoing relationship. This in turn causes a considerable pressure build-up, which actually contributes to an increase in temperature as the polymer passes through the cooling device, due to the resulting work energy. If the tubes have a diameter of more than about 2 inches, the heat transfer coefficient between polymer located near the center of the tube and the cooling medium becomes too low to accomplish efficient cooling. Tubes having an internal diameter of about 1 inch have been found to offer a good compromise between pressure drop and heat transfer coefficient.

Figure 9:
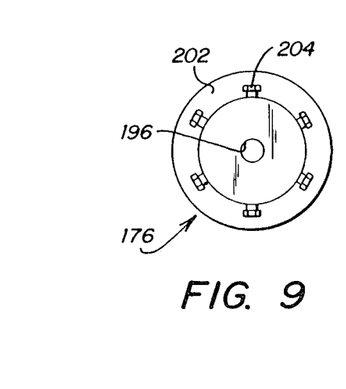
FIG. 9 is a transverse elevation view of the inlet end of the cooling means shown in FIG. 7.
Figure 10:
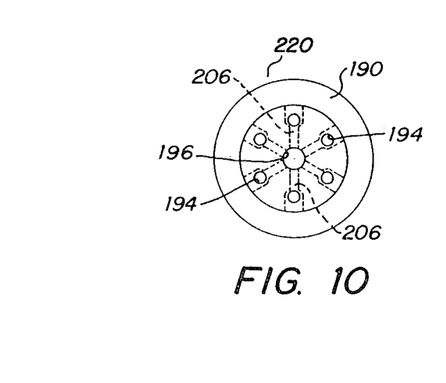
FIG. 10 is a transverse elevation view of the inlet end of the tube sheet portion of a cooling means of the type shown in FIG. 7.
Figure 13:
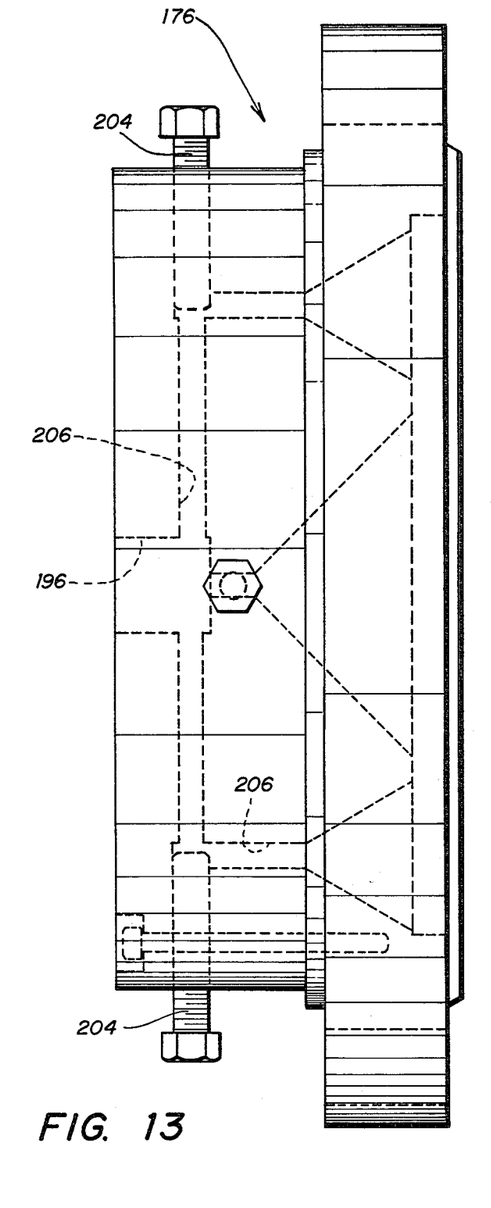
FIG. 13 is an enlarged sectional elevation view of the inlet valve assembly of the cooling means shown in FIG. 7.

One means of providing an orifice at the inlet end of each tube 194 is to position a valve in each tube, whereby a variable size orifice is provided. This embodiment of the invention is illustrated in FIGS. 7 and 9 of the drawings. In those figures, inlet valve assembly 176 comprises polymer inlet port 196, inlet flange plate 202, and a plurality of valves 204, one for each of the tubes 194. FIG. 9 depicts a transverse elevation view of inlet valve assembly 176. FIG. 10 depicts the configuration of an inlet polymer distribution device 220, by which the flow of thermoplastic polymer composition through polymer inlet port 196 is divided and directed through passage-ways 206 to tubes 194. By including a separate valve 204 for each tube 194 to produce inlet valve assembly 176, shown in more detail in FIG. 13, it is possible to control the flow of thermoplastic composition through tubes 194 in accordance with the relationship defined above so as to maintain a hydraulic balance across the cooling device and maximize heat transfer to the cooling medium circulating through shell 174.

Figure 12:
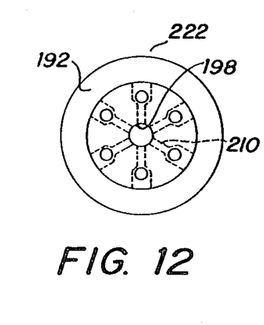
FIG. 12 is a transverse elevation view of the outlet end of the tube sheet portion of a cooling means of the type shown in FIG. 7.

FIG. 12 illustrates an outlet polymer collection device 222, by which the flow of polymer through tubes 194 is collected via passage-ways 210 and fed into polymer outlet port 198.

Figure 11:
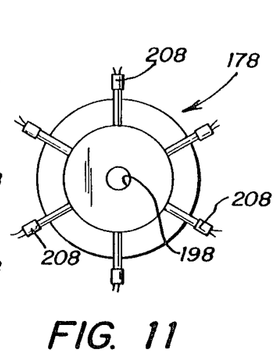
FIG. 11 is a transverse elevation view of the outlet end of the cooling means shown in FIG. 7.

According to a preferred embodiment of cooling means 172, the temperature of the thermoplastic composition exiting each tube 194 is monitored by thermocouples 208 positioned in outlet thermocouple assembly 178 as shown in FIGS. 7 and 11. For example, the thermocouples 208 may be positioned in the passageways 210 of the outlet polymer collection device shown in FIG. 12. When the temperature of the thermoplastic composition exiting any tube 194 becomes too great, this is indicative that that particular tube is no longer in hydraulic balance with the remaining tubes. This means that the polymer is beginning to selectively channel through the particular tube. It is then possible to place this tube back into hydraulic balance and reduce the exit temperature by reducing the flow through that tube by partially closing the corresponding valve 204 in inlet valve assembly 176. It will be apparent that this control process can be done either manually or automatically through use of conventional instrumentation linking directly the valves 204 with the respective thermocouples 208. Generally, however, once a hydraulic balance has been achieved, it is quite stable, so that manual operation of valves 204 is entirely satisfactory.

Figure 14:
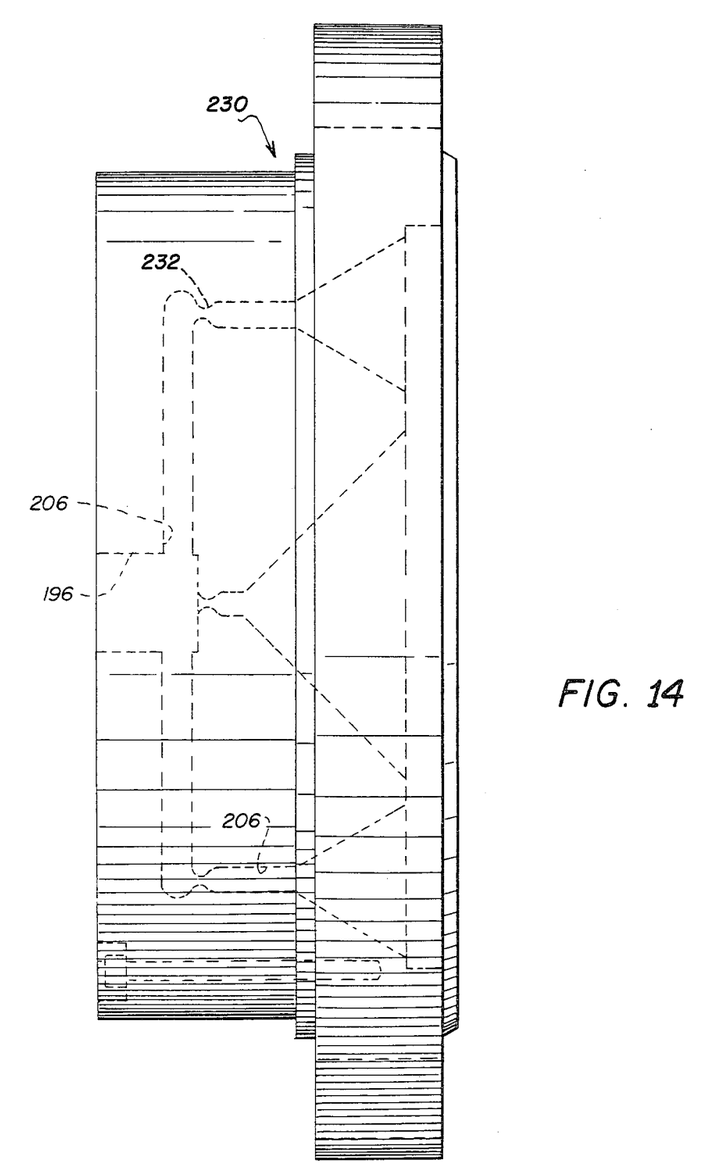
FIG. 14 is an isolated transverse elevation view of an intermediate plate which can be used in one embodiment of a cooling means of the type shown in FIG. 7.

In an alternative embodiment, an inlet apertured plate 230 is provided. This plate can either replace inlet valve assembly 176, or be located at the inlet end of each tube 194 as an intermediate plate 230 between the tube sheet flange 190 and the inlet flange plate 202 of inlet polymer distribution device 220 shown in FIG. 10. Of course, if plate 230 is provided as an intermediate plate, the valving system of inlet valve assembly 176 illustrated in FIGS. 7, 9 and 13 would no longer be required in view of the aperture arrangement of plate 230. Such an intermediat plate 230 is illustrated by itself in FIG. 14. Plate 230 is provided with a plurality of apertures 232 corresponding in number to the number of tubes 194 and positioned in plate 230 in the same spatial configuration as the tubes 194 are fixed within tube sheet 190. The size of apertures 232 must be predetermined to satisfy the above-defined pressure drop relationship for the particular tube size and polymer material which is to be processed, i.e., the latter determines the polymer viscosity which is a relevant aspect of the resulting pressure drop. With this embodiment, it is a simple matter to adapt the extrusion apparatus for processing different polymeric materials, since a number of interchangable intermediate plates 230 having different aperture sizes can be provided, and the appropriate one can be readily inserted into the cooling means 172 as required.

In another important aspect of the present invention, the cooling means 12 is constructed so that it contains, at any one time, a volume of polymer material which is larger than the volume of heat plastified polymer contained in the extruder 10. Preferably, the volume of polymer in the cooling means is at least 2 times and more preferably at least 5 or 6 times the volume contained in the extruder. This enables the extruder to be operated at very high rates, while at the same time permitting the polymer to have a sufficiently long residence time in the cooling means so that it can be effectively cooled. By running the extruder at a higher speed, of course, the polymer exiting from the extruder will be at a higher temperature. In the case of a foamed polymer extrusion process, however, this higher temperature is advantageous while the polymer is still in the extruder, because it is easier to disperse the blowing agent uniformly therein, e.g., freon-type blowing agents are more soluble at higher temperatures.

Therefore, in accordance with the present invention, it is possible to run the extruder at a very high speed. This not only increases the throughput of the extruder line, but has the added benefit of producing an improved foamed product, i.e., a product with a more uniform cell size distribution because of improved dispersion of the blowing agent throughout the polymer.

By virtue of the increased efficiency in the cooling means achieved according to the invention, as a result of the hydraulic balance maintained over the cooling means, the polymer can be brought to an extremely uniform temperature, i.e., there are no temperature gradients within the polymer mass. This is extremely advantageous in a process for producing foamed thermoplastic products, since the resulting uniformity of expansion produces an improved product having a uniform density and cell structure.

With these foregoing features, the apparatus according to the invention is especially well suited for extruding foamed products from thermoplastic polymers which require exact temperature control and uniformity just prior to being passed through the extrusion die orifice and thereafter expanded. Temperature uniformity is assured by the above-described measure of hydraulic balance across the cooling device, and this in turn permits precise temperature control by the use of a cooling medium having a temperature which is kept at the final temperature desired for the polymer. This is possible in view of the relatively long residence times provided, and it further minimizes the possibilities for undersirable temperature gradients in the polymer. As a result of the capability for precise temperature control, the apparatus according to the invention is particularly suited for extrusion of foamed polymers having very critical temperature control constraints, such as polyethylene. In fact, it is even possible to produce at greatly increased rates foamed polyethylene products of excellent quality which contain high percentages of additives, such as fire-retardant additives.

By employing the apparatus in this specification, it is possible to achieve throughput rates up to about five times greater than those previously experienced through use of a conventional extrusion apparatus. Furthermore, the subject apparatus permits the production of foamed thermoplastic compositions having significantly lower densities, smaller average cell size and more uniformity of cell size than those which can be made by conventional methods.

While this invention has been described in relation to its preferred embodiments, it is to be understood that various modifications thereof will be apparent to those of ordinary skill in the art upon reading this specification, and it is intended to cover all such modifications as fall within the scope of the appended claims.

What is claimed is:

1. An apparatus for extruding a thermoplastic resinous composition, comprising:
an extruder for heat plastifying the thermoplastic resinous composition and forwarding same in an extrusion direction;
means, positioned downstream of said extruder and communicating with the outlet port of said extruder for cooling the heat plastified thermoplastic resinous composition exiting from said extruder to a uniform temperature desired for extrusion through an extrusion die, said cooling means including at least one enclosed flow path for conveying the heat plastified thermoplastic resinous composition from the inlet of said cooling means to the outlet of said cooling means, means for circulating a cooling medium about the entire circumference of each said resin flow path and means for maintaining a hydraulic balance between the inlet and the outlet of said cooling means across the entire cross-section of each said resin flow path; and
an extrusion die, including a die orifice positioned downstream of said cooling means and communicating with the outlet of said cooling means for receiving cooled, heat plastified thermoplastic resinous composition therefrom for extrusion through the die orifice, said cooling means comprising a substantially cylindrical vessel having three generally concentrically arranged axial passageways, wherein said enclosed flow path comprises the middle passageway and wherein said cooling medium circulating means comprises the inner and outer passageways and wherein said hydraulic balance maintaining means comprises a plurality of first apertures evenly spaced about the circumference of the inlet end of said middle passageway and a plurality of second apertures evenly spaced about the circumference of the outlet end of said middle passageway, said second apertures being sized in relationship to said first apertures so as to maintain said hydraulic balance.

2. An apparatus according to claim 1, wherein said means for circulating a cooling medium comprises means for circulating cooling medium generally countercurrently to the flow of heat plastified thermoplastic resinous material through said cooling means.

3. An apparatus according to claim 1, wherein said extruder comprises only a single extruder screw.

4. An apparatus according to claim 1, wherein said extruder comprises means for introducing a blowing agent into the heat plastified thermoplastic resinous composition contained therein.

5. An apparatus according to claim 1, wherein the total cross-sectional area of said second apertures is larger than the total cross-sectional area of said first apertures.

6. An apparatus according to claim 1, wherein said extrusion die is integrally attached to the distal end and forms a part of said cooling means.

7. An apparatus as claimed in claim 1, wherein the total volume of said enclosed flow paths in said cooling means is larger than the volume of heat plastified thermoplastic resinous material in said extruder.

8. An apparatus as claimed in claim 7, wherein the total volume of said enclosed flow paths in said cooling means is at least about 5 times larger than the volume of heat plastified thermoplastic resinous material in said extruder.

9. An apparatus according to claim 1, wherein said cooling means comprises three concentrically and coaxially positioned, substantially cylindrical vessels having generally parallel cylindrical circumferential surface and generally parallel circular end faces, wherein the inlet end of said middle chamber comprises an inlet conduit passing through the upstream end faces of the outer vessel and the middle vessel and abutting against the upstream end face of the inner vessel, and wherein the outlet end of said middle chamber comprises an outlet conduit passing through the downstream end faces of the outer vessel and the middle vessel and abutting against the downstream end of the inner vessel.

10. An apparatus according to claim 9, wherein said first apertures are formed in said inlet conduit in the space between the upstream end faces of the inner and middle vessels, and said second apertures are formed in said outlet conduit in the space between the downstream end faces of the inner and middle vessels.

11. An apparatus according to claim 10, wherein said cooling means further comprises means, including a plurality of circumferentially spaced vane members radially extending in the space between the upstream end faces of the inner and middle vessels, for uniformly distributing the heat plastified thermoplastic resinous composition about the entire cross-section of said enclosed flow path.

12. An apparatus according to claim 11, wherein said cooling means further comprises means, including a plurality of circumferentially spaced vane members radially extending in the space between the downstream end faces of the inner and middle vessels, for uniformly collecting the heat plastified thermoplastic resinous composition from the entire cross-section of said enclosed flow path.

13. An apparatus according to claim 10, wherein said cooling medium circulating means includes a first cooling medium inlet conduit for introducing cooling medium into the downstream end of the inner vessel, a second cooling medium inlet conduit for introducing cooling medium into the downstream end of the outer vessel in said outer chamber, and a cooling medium outlet positioned at the upstream end of said cooling means and communicating with said inner and outer chambers.

14. An apparatus according to claim 13, wherein said cooling medium circulating means further includes baffle members positioned in said inner and outer chambers.

* * * * *